United States Patent
Kumar Agrawal et al.

(10) Patent No.: US 11,606,454 B2
(45) Date of Patent: Mar. 14, 2023

(54) METHODS AND DEVICES FOR PRECLUDING EXECUTION OF FUNCTIONS ASSOCIATED WITH TOUCH ACTUATORS

(71) Applicant: Motorola Mobility LLC, Chicago, IL (US)

(72) Inventors: Amit Kumar Agrawal, Bangalore (IN); Zhiyi Cai, Fujian (CN); Olivier Meirhaeghe, Lincolnshire, IL (US)

(73) Assignee: Motorola Mobility LLC, Chicago, IL (US)

( * ) Notice: Subject to any disclaimer, the term of this patent is extended or adjusted under 35 U.S.C. 154(b) by 177 days.

(21) Appl. No.: 17/185,608

(22) Filed: Feb. 25, 2021

(65) Prior Publication Data
US 2022/0256025 A1   Aug. 11, 2022

(30) Foreign Application Priority Data
Feb. 9, 2021   (CN) .......................... 202110175945.7

(51) Int. Cl.
H04M 1/72403   (2021.01)
H04M 1/72454   (2021.01)
G06F 3/16   (2006.01)
H04M 1/27   (2006.01)

(52) U.S. Cl.
CPC ........ *H04M 1/72403* (2021.01); *G06F 3/165* (2013.01); *H04M 1/271* (2013.01); *H04M 1/72454* (2021.01); *H04M 2250/22* (2013.01)

(58) Field of Classification Search
CPC ............. H04M 1/72403; H04M 1/271; H04M 1/72454; H04M 1/72463; H04M 1/236; H04M 2250/22; G06F 3/165
See application file for complete search history.

(56) References Cited

U.S. PATENT DOCUMENTS

| | | | | | |
|---|---|---|---|---|---|
| 5,831,598 | A | * | 11/1998 | Kauffert | ............ H04M 1/2472 |
| | | | | | 345/172 |
| 2015/0362989 | A1 | * | 12/2015 | Tyagi | ................... G06V 10/147 |
| | | | | | 345/156 |

FOREIGN PATENT DOCUMENTS

| CN | 106297842 A | * | 1/2017 | |
| CN | 105721696 B | * | 1/2020 | ............ H04M 1/271 |
| KR | 101883762 B1 | * | 7/2018 | |

OTHER PUBLICATIONS

"Google Assistant Community", Google Assistant Greyed Out when App not Set to Correct Service; online community posting; Originally Posted Mar. 1, 2019 at https://support.google.com/assistant/thread/1952654?hl=en.
Fingas, J , "Google brings dedicated Assistant buttons to more phones", Published Feb. 24, 2019 online at https://www.engadget.com/2019-02-24-google-assistant-buttons-on-more-phones.html ; Viewed online Apr. 27, 2021.

* cited by examiner

*Primary Examiner* — Farid Seyedvosoghi
(74) *Attorney, Agent, or Firm* — Philip H. Burrus, IV

(57) ABSTRACT

An electronic device includes a device housing supporting a touch actuator operable to initiate a predefined function of the electronic device. One or more processors of the electronic device are operable with the touch actuator. The one or more processors preclude initiation of the predefined function when a predefined condition occurs while the touch actuator is actuated.

20 Claims, 7 Drawing Sheets

METHODS AND DEVICES FOR PRECLUDING EXECUTION OF FUNCTIONS ASSOCIATED WITH TOUCH ACTUATORS

CROSS REFERENCE TO PRIOR APPLICATIONS

This application claims priority and benefit under 35 U.S.C. § 119 from Chinese Patent Application No. 202110175945.7, filed Feb. 9, 2021, which is incorporated by reference by rule in accordance with 37 CFR § 1.57.

BACKGROUND

Technical Field

This disclosure relates generally to electronic devices, and more particularly to electronic devices operable with touch actuators.

Background Art

Modern electronic devices, such as smartphones, are becoming increasingly more advanced. Nowhere is this more apparent than with respect to the user interfaces of such devices. Not too long ago most smartphones or other similar electronic devices had a physical keyboard with an array of keys or buttons. Today, touch sensitive displays and voice actuated user interfaces are the norm. While these modern user interfaces generally simplify device operation, unintended device operation can still occur when imprecise user input is received. It would be advantageous to have improved methods and devices to make the use of these user interfaces more seamlessly perform in the manner intended by users.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
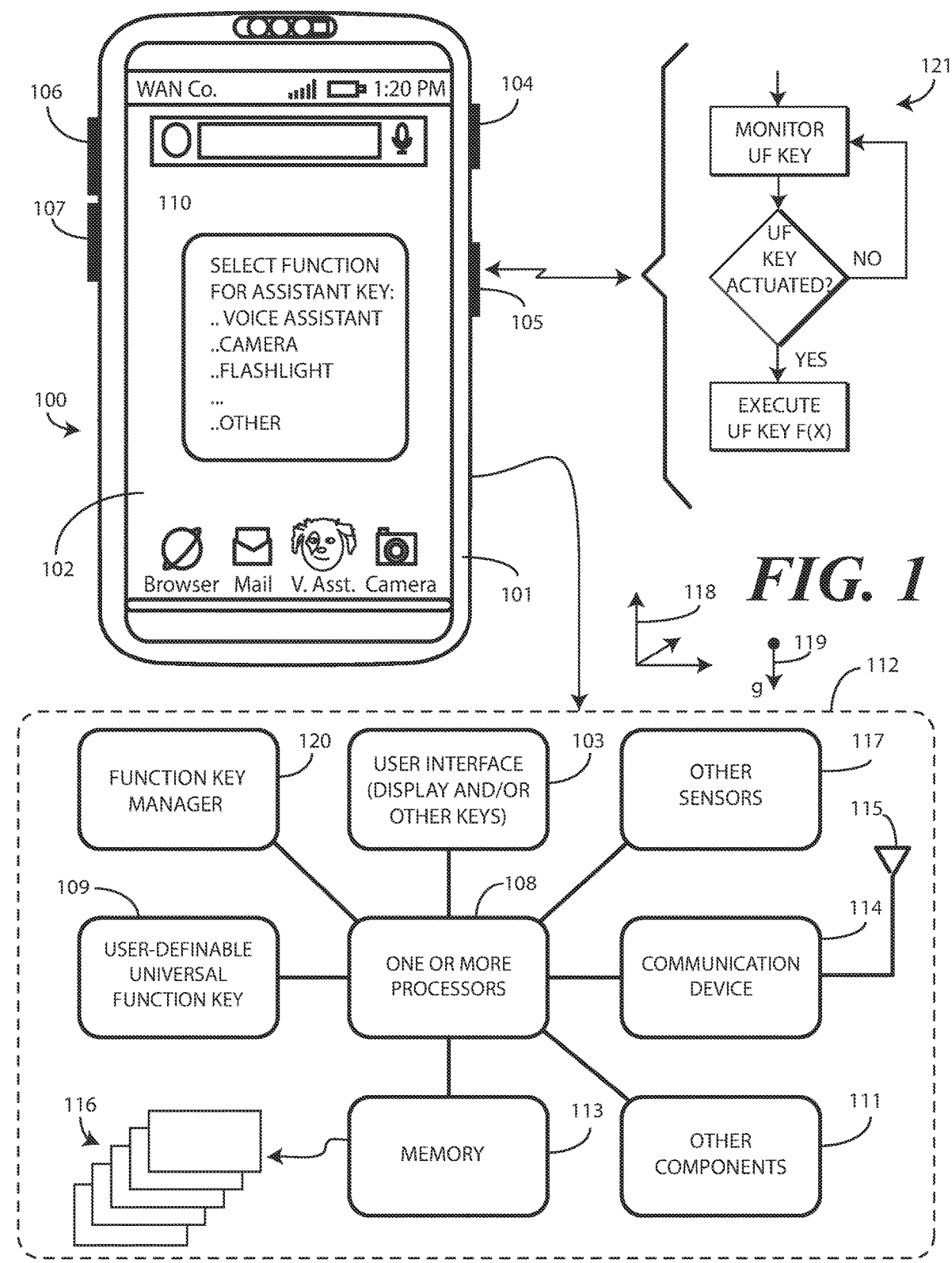
FIG. 1 illustrates one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to precluding the execution of a predefined function in response to actuation of a touch actuator of an electronic device, which may be a user actuation target, a physical button, touch sensitive surface, or other type of touch actuator. Any process descriptions or blocks in flow charts should be understood as representing modules, segments, or portions of code that include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of precluding the initiation of a function associated with a touch actuator, which may be a voice assistant function, user-defined, universal function, or other type of function, when a predefined condition occurs as described herein. The non-processor circuits may include, but are not limited to, a radio receiver, a radio transmitter, signal drivers, clock circuits, power source circuits, and user input devices. As such, these functions may be interpreted as steps of a method to perform preclusion of execution of the predefined function in response to actuation of the touch actuator of the electronic device when the predefined condition occurs.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within 1 percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an electronic device having a user interface. In one or more embodiments, the user interface includes a touch actuator. Examples of such touch actuators include a physical key, a physical button, a touch sensitive surface, or a user actuation target being presented along a touch sensitive display. Other examples of touch actuators will be obvious to those of ordinary skill in the art having the benefit of this disclosure.

In one or more embodiments, the touch actuator is associated with a predefined function. In one or more embodiments, the touch actuator is associated with a single predefined function such that when the touch actuator is actuated, that one, singular function is initiated. Illustrating by example, in one or more embodiments, the touch actuator is associated with a voice assistant function. In one or more embodiments, the touch actuator is configured as a dedicated button situated on a minor face of a device housing of an electronic device. When a user presses the touch actuator, a voice assistant function is initiated. Thus, rather than a user having to type in a question such as "how tall is the Sears tower," in an electronic device equipped with a voice assistant touch actuator that same user can simply press the touch actuator and ask the question audibly. Thereafter, one or more processors executing the voice assistant feature retrieve the answer and deliver it back to the user through an audio output of the electronic device.

While a voice assistant feature is one example of a function that can be associated with a touch actuator, embodiments of the disclosure are not so limited. In other embodiments, the touch actuator can be associated with different functions. Illustrating by example, in another embodiment the touch actuator is associated with a camera function such that an image capture application is actuated in response to actuation of the touch actuator. In another embodiment, the touch actuator is associated with a flashlight function such that an exterior light is controlled by actuation of the touch actuator. These examples are illustrative only, as others will be obvious to those of ordinary skill in the art having the benefit of this disclosure.

In one or more embodiments, the function associated with the touch actuator is user definable. Illustrating by example, using the settings and menus of the electronic device, a user can define a predefined function to be associated with a specific touch actuator. In one or more embodiments, this predefined function is assigned to the touch actuator on a one-to-one basis, such that actuation of the touch actuator performs only that single function and no other. If a user wants actuation of the touch actuator to transition the electronic device to a silent mode of operation where ringtones and other audible alerts are silenced, in one or more embodiments they may assign this function to the touch actuator using the control settings of the electronic device. Where the function associated with the touch actuator is user definable, that function may be referred to as a user-defined function. Where the function associated with the touch actuator is both user defined and singular, i.e., where actuation of the touch actuator performs only one function regardless of operating mode of the electronic device, this function may be referred to as a user-defined, universal function due to the fact that the function is initiated in response to actuation of the touch actuator across all operating modes of the electronic device.

Embodiments of the disclosure contemplate that many electronic device configurations will include other touch actuators proximately located with the touch actuator operating the voice assistant function, user-defined function, or user-defined, universal function. Illustrating by example, many smartphones include a power button located on a minor face of the electronic device. Many electronic devices also include volume up/volume down buttons, silent mode switches, or other user interface controls situated on minor faces of the electronic device.

Where an electronic device is so configured, embodiments of the disclosure contemplate that a user may inadvertently actuate the touch actuator when trying to actuate one of these other user interface controls. For instance, when trying to turn the volume down using a volume down key, a user may inadvertently press a touch actuator associated with a voice assistant function. Where this occurs, the screen may go blank while the voice assistant application is launched and other audio outputs are paused, thereby interrupting the playback of audio, a video, or other content. Where the touch actuator associated with the voice assistant function is proximately located with the volume controls, and where this repeatedly happens, a user can become frustrated that the touch actuator, which ordinarily makes usage of the electronic device more efficient, exists at all.

Advantageously, embodiments of the disclosure help to eliminate such frustrations by determining, with one or more processors, whether at least one predefined condition is occurring concurrently with the actuation of the touch actuator. Examples of such predefined conditions include the actuation of the touch actuator exceeding a predefined duration threshold, the electronic device being in a pocket when the touch actuator is actuated, actuation of another touch actuator occurring concurrently with the actuation of the touch actuator, the electronic device being oriented in a landscape orientation in three-dimensional space, the electronic device being oriented in a landscape orientation in the three-dimensional space with the touch actuator being positioned on the bottom of the electronic device, and so forth. These predefined conditions are illustrative only. Others will be described below. Still others will be obvious to those of ordinary skill in the art having the benefit of this disclosure.

In one or more embodiments, when the predefined condition is occurring while the touch actuator is actuated, the one or more processors of the electronic device preclude the execution of the predefined function associated with, and ordinarily responsive to, actuation of the touch actuator. Alternatively, when the predefined condition is occurring while the touch actuator is actuated, the one or more processors preclude initiation of the function associated with, and otherwise responsive to, actuation of the touch actuator.

Illustrating by example, in one or more embodiments a touch actuator is configured as a physical key situated along a minor face of an electronic device. In one or more embodiments, the touch actuator is universally associated with a voice assistant function, such that actuation of the touch actuator executes a voice assistant function. As noted above, the voice assistant function is explanatory, as other functions can be substituted for this function.

In one or more embodiments, one or more processors of the electronic device determine whether a predefined condition occurs concurrently with, or within a predefined duration of, actuation of this physical voice assistant key. In one or more embodiments, when the predefined condition occurs concurrently with, or within the predefined duration of, the actuation of the physical voice assistant key, the one or more processors preclude the execution of the voice assistant function of the electronic device. By contrast, when the predefined condition fails to occur concurrently with, or within the predefined duration of, actuation of the physical voice assistant key, the one or more processors execute the voice assistant function. In one or more embodiments, this execution of the voice assistant function occurs only after the physical voice assistant key of the electronic device is released, thereby further preventing false actuation of the voice assistant function.

Embodiments of the disclosure advantageously optimize touch actuator management to avoid accidental invocation of predefined functions associated with touch actuator. Without embodiments of the disclosure, such accidental invocations can occur when the touch actuator is inadvertently actuated. Where an electronic device is equipped as described herein, one or more processors conclude that actuation of a touch actuator is inadvertent when a predefined condition, such as the electronic device being oriented in a landscape orientation with the touch actuator situated on the lower minor face of the electronic device in three-dimensional space, exists while the touch actuator is being actuated. Embodiments of the disclosure advantageously help to eliminate user frustration occurring when universal function touch actuators are inadvertently actuated.

Turning now to FIG. 1, illustrated therein is one explanatory electronic device 100 configured in accordance with one or more embodiments of the disclosure. The electronic device 100 of FIG. 1 is a portable electronic device. For illustrative purposes, the electronic device 100 is shown as a smartphone. However, the electronic device 100 could be any number of other devices as well, including tablet computers, gaming devices, multimedia players, and so forth. Still other types of electronic devices can be configured in accordance with one or more embodiments of the disclosure as will be readily appreciated by those of ordinary skill in the art having the benefit of this disclosure.

This illustrative electronic device 100 includes a display 102, which may optionally be touch-sensitive. In one embodiment where the display 102 is touch-sensitive, the display 102 can serve as a primary user interface 103 of the electronic device 100. Users can deliver user input to the display 102 of such an embodiment by delivering touch input from a finger, stylus, or other objects disposed proximately with the display 102. In one embodiment, the display 102 is configured as an active matrix organic light emitting diode (AMOLED) display. However, it should be noted that other types of displays, including liquid crystal displays, would be obvious to those of ordinary skill in the art having the benefit of this disclosure.

The explanatory electronic device 100 of FIG. 1 includes a device housing 101. In one embodiment, the device housing 101 includes two housing members, such as a front housing member disposed about the periphery of the display 102 and a rear-housing member forming the backside of the electronic device 100. Features can be incorporated into the device housing 101, including an optional camera or an optional speaker port.

The electronic device 100 of FIG. 1 is shown as a "candy bar" device where the device housing 101 is non-bendable and non-deformable. In one or more embodiments, the device housing 101 is manufactured from a rigid material such as a rigid thermoplastic, metal, or composite material, although other materials can be used.

Still other constructs will be obvious to those of ordinary skill in the art having the benefit of this disclosure. Illustrating by example, in other embodiments, the electronic device 100 will be configured as a bendable or "clam shell" device. For instance, in another embodiment the electronic device 100 includes a first device housing and a second device housing, with a hinge coupling the first device housing to the second device housing such that the first device housing is pivotable about the hinge relative to the second device housing between an axially displaced open position and a closed position. Electronic devices configured in accordance with embodiments of the disclosure can include a single hinge or multiple hinges as well.

Features can be incorporated into, or positioned along, the device housing 101. Illustrating by example, the explanatory electronic device 100 of FIG. 1 includes and supports several touch actuators 104, 105, 106, 107.

While the touch actuators 104, 105, 106, 107 of the illustrative embodiment of FIG. 1 are configured as push buttons, it should be noted that the touch actuators 104, 105, 106, 107 can take other forms as well. In another embodiment, the touch actuators 104, 105, 106, 107 are configured as touch sensitive surfaces. In other embodiments, the touch actuators 104, 105, 106, 107 are configured as user actuation targets presented on the display 102. In still other embodiments, the touch actuators 104, 105, 106, 107 are configured as rocker switches, slider switches, or another type of touch switch.

Other examples of touch actuators include the use of a force sensor comprising resistive switches or a force switch array configured to detect contact with either the display 102 or the device housing 101 of an electronic device 100. The array of resistive switches can function as a force-sensing layer defining one or more touch actuators, in that when contact is made with either the surface of the display 102 or the device housing 101 of the electronic device 100, changes in impedance of any of the switches may be detected. The array of switches may be any of resistance sensing switches, membrane switches, force-sensing switches such as piezoelectric switches, or other equivalent types of technology.

In another embodiment, the force sensor serving as the touch actuator can be capacitive. In yet another embodiment, piezoelectric sensors can be configured to sense touch as well. For example, where coupled with the lens of the display 102, the piezoelectric sensors can be configured to detect an amount of displacement of the lens to determine that a touch actuator defined by the piezoelectric sensors has been actuated. The piezoelectric sensors can also be configured to determine force of contact against the housing of the electronic device 100 rather than the display 102.

Still other examples of touch actuators will be obvious to those of ordinary skill in the art having the benefit of this disclosure. Regardless of type, in one or more embodiments the touch actuators 104, 105, 106, 107 are configured to receive touch input for actuation, communicating electronic signals corresponding to this touch input and/or actuation to one or more processors 108 of the electronic device 100.

In the illustrative embodiment of FIG. 1, touch actuator 104 comprises a power touch actuator. Actuating this touch actuator 104 turns the electronic device ON or OFF. Touch actuator 106 is a volume up touch actuator, while touch actuator 107 is a volume down touch actuator. Actuation of touch actuator 106 causes volume of an audio output of the electronic device 100 to get louder, while actuation of touch actuator 107 causes the volume of the audio output of the electronic device 100 to get softer, and so forth. These functions are explanatory only, as other electronic devices will include touch actuators that have different functions associated therewith. However, in many smartphone configurations, the inclusion of a power touch actuator, volume up touch actuator, and volume down touch actuator is common.

Touch actuator 105 is special and distinct from touch actuators 104, 106, 107 in that it is a predefined, and sometimes dedicated or universal, function touch actuator in this illustrative embodiment. Said differently, in one or more embodiments touch actuator 105 has associated therewith a predefined function, which can be user definable. One example of such a predefined, dedicated or universal function used in this disclosure for explanatory purposes is that of a voice assistant function. Where so configured, actuation of touch actuator 105 will cause the one or more processors 108 of the electronic device 100 to initiate or execute a voice assistant function.

In one or more embodiments, the predefined function associated with touch actuator 105 is a universal function. Illustrating by example, where the predefined function is a universal voice assistant function, actuation of the touch actuator 105 will cause the one or more processors 108 to actuate, execute, or initiate the voice assistant function regardless of the operating mode of the electronic device 100. If, for example, the electronic device 100 is OFF, touch actuator 105 is configured as a universal voice assistant function touch actuator, and touch actuator 105 is actuated, the voice assistant function will commence. Similarly, if the electronic device 100 is ON and is in a video presentation mode, with touch actuator 105 configured as the universal voice assistant function touch actuator, actuation of touch actuator 105 will also cause the voice assistant function to commence.

Configuring the touch actuator 105 as a universal predefined function touch actuator causes a singular predefined function to occur responsive to actuation of the touch actuator 105. By contrast, in other embodiments where the touch actuator 105 is not configured as a universal predefined function touch actuator, actuation of touch actuator 105 may cause one of a plurality of predefined functions to occur, with the particular predefined function being a function of the present operating mode of the electronic device 100.

In one or more embodiments, touch actuator 105 comprises a user-defined, universal function touch actuator 109. In one or more embodiments, a user of the electronic device 100 can define what universal predefined function (or alternatively what non-universal predefined functions) is to commence when touch actuator 105 is actuated. Illustrating by example, in one or more embodiments the user can employ a menu 110 or other settings control of the electronic device 100 to define the universal predefined function that is to be assigned to the touch actuator 105.

In one or more embodiments, this predefined function is assigned to the touch actuator 105 on a one-to-one basis, such that actuation of the touch actuator 105 performs only that single function and no other. If a user wants actuation of the touch actuator 105 to initiate a silent mode of the electronic device 100 where ringtones and other audible alerts are silenced, in one or more embodiments they may assign this function to the touch actuator 105 using the menu 110 or other control settings of the electronic device 100, and so forth.

For illustration purposes throughout the disclosure, the predefined function associated with touch actuator 105 will be that of a voice assistant function. Where so configured, when a user presses the touch actuator 105 a voice assistant function is initiated. Thus, using the electronic device 100 of FIG. 1, rather than typing in a question such as "how tall is the Sears tower" using a virtual keypad configured as a plurality of user actuation targets presented on the display, a user can simply press the touch actuator 105, which launches the voice assistant function. Thereafter, the user can simply ask the question, with the one or more processors 108 executing the voice assistant feature, retrieving the answer, and delivering it back to the user through an audio output included with the other components 111 of the electronic device 100.

Again it should be noted that while a voice assistant function is one example of a predefined function or universal predefined function that can be associated with the touch actuator 105, embodiments of the disclosure are not so limited. In other embodiments, the touch actuator 105 can be associated with different functions, including a camera function causing the one or more processors 108 to actuate an image capture application, a flashlight function causing the one or more processors 108 to actuate an exterior light, and so forth. These examples are illustrative only, as others will be obvious to those of ordinary skill in the art having the benefit of this disclosure.

In the illustrative embodiment of FIG. 1, the touch actuators 104, 105, 106, 107 are situated on minor faces or edges of the electronic device 100. In other embodiments, touch actuators can be positioned on major faces, or along a combination of major faces and minor faces. Moreover, the configuration of the touch actuators 104, 105, 106, 107 shown in FIG. 1 should be understood to be illustrative, as others are within the scope of the disclosure.

Illustrating by example, in another embodiment touch actuator 105 could be positioned on the same side of the electronic device 100 as touch actuator 106 and touch actuator 107. In still another embodiment, touch actuator 104 could be positioned on the same side of the electronic device 100 as touch actuator 106 and touch actuator 107, while touch actuator 105 is situated on the opposite side of the electronic device 100, and so forth. In one or more embodiments, however, at least one other touch actuator, e.g., touch actuator 105 or combined touch actuator 106 and touch actuator 107, are positioned along the same face, be it a major face or minor face, as is touch actuator 105.

Accordingly, any of the features shown in FIG. 1 as being positioned along the left and right sides of the electronic device 100 could be located elsewhere, such as on the front side of the electronic device 100 or rear side of the electronic device 100 in other embodiments. In other embodiments, one or more of the touch actuators shown in FIG. 1 may be omitted.

A block diagram schematic 112 of the electronic device 100 is also shown in FIG. 1. The block diagram schematic 112 can be configured as a printed circuit board assembly disposed within the device housing 101. Various components can be electrically coupled together by conductors or a bus disposed along one or more printed circuit boards.

In one or more embodiments, the electronic device 100 includes one or more processors 108. In one embodiment, the one or more processors 108 can include an application processor and, optionally, one or more auxiliary processors. One or both of the application processor or the auxiliary processor(s) can include one or more processors. One or both of the application processor or the auxiliary processor (s) can be a microprocessor, a group of processing components, one or more ASICs, programmable logic, or other type of processing device.

The application processor and the auxiliary processor(s) can be operable with the various components of the electronic device 100. Each of the application processor and the auxiliary processor(s) can be configured to process and execute executable software code to perform the various functions of the electronic device 100. A storage device, such as memory 113, can optionally store the executable software code used by the one or more processors 108 during operation.

In this illustrative embodiment, the electronic device 100 also includes a communication device 114 that can be configured for wired or wireless communication with one or more other devices or networks. The networks can include a wide area network, a local area network, and/or personal area network. The communication device 114 may also utilize wireless technology for communication, such as, but are not limited to, peer-to-peer or ad hoc communications such as HomeRF, Bluetooth and IEEE 802.11, and other forms of wireless communication such as infrared technology. The communication device 114 can include wireless communication circuitry, one of a receiver, a transmitter, or transceiver, and one or more antennas 115 in one or more embodiments.

In one embodiment, the one or more processors 108 can be responsible for performing the primary functions of the electronic device 100. For example, in one embodiment the one or more processors 108 comprise one or more circuits operable with one or more user interface devices, which can include the display 102, to present, images, video, or other presentation information to a user. The one or more processors 108 are also operable with the touch actuators 104, 105, 106, 107 to initiate, execute, or actuate the predefined functions associated with each, bet that function a dedicated function, user defined function, user-defined, universal function, or other type of function. The executable software code used by the one or more processors 108 can be configured as one or more modules 116 that are operable with the one or more processors 108. Such modules 116 can store instructions, control algorithms, logic steps, and so forth.

In one embodiment, the one or more processors 108 are responsible for running the operating system environment of the electronic device 100. The operating system environment can include a kernel and one or more drivers, and an application service layer, and an application layer. The operating system environment can be configured as executable code operating on one or more processors or control circuits of the electronic device 100. The application layer can be responsible for executing application service modules. The application service modules may support one or more applications or "apps." The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

In one embodiment, the one or more processors 108 may generate commands or execute control operations based upon user input received at the user interface 103, including touch input received by any of the touch actuators 104, 105, 106, 107. Moreover, the one or more processors 108 may process the received information alone or in combination with other data, such as the information stored in the memory 113.

The electronic device 100 can include one or more sensors 117. The one or more sensors 117 may include a microphone, an earpiece speaker, and/or a second loudspeaker. The one or more other sensors 117 may also include touch actuator selection sensors, proximity sensors, a touch pad sensor, a touch screen sensor, a capacitive touch sensor, and one or more switches. Touch sensors may used to indicate whether any of the user actuation targets present on the display 102 are being actuated. Alternatively, touch sensors disposed in the electronic device 100 can be used as touch actuators by determining whether the electronic device 100 is being touched at predefined locations situated along side edges or major faces of the device housing 101. The touch sensors can include surface and/or housing capacitive sensors in one embodiment. The other sensors 117 can also include audio sensors and video sensors (such as a camera).

The one or more sensors 117 can, in one or more embodiments, determine whether a predefined condition is occurring when various operations of the electronic device are carried out, or while various types of user input are being received. For instance, in one or more embodiments the one or more sensors 117 can determine whether the electronic device 100 is oriented in a portrait mode in three-dimensional space 118, as shown in FIG. 1, or whether the electronic device 100 is oriented in a landscape mode in the three-dimensional space 118. In one or more embodiments, the one or more sensors 117 can additionally sense whether the minor face with touch actuators 106, 107 is atop the electronic device 100 relative to a direction of gravity 119, or alternatively whether the minor face with touch actuators 104, 105 is atop the electronic device relative to the direction of gravity 119.

In one or more embodiments, the one or more sensors 117 include one or more inertial motion units. In one or more embodiments, each inertial motion unit comprises a combination of one or more accelerometers and one or more gyroscopes. Each inertial motion unit can optionally comprise one or more magnetometers. The electronic device 100 of FIG. 1 may include one inertial motion unit, while a hinged electronic device having a first device housing and a second device housing may include one inertial motion unit in the first device housing and another in the second device housing, and so forth.

In one or more embodiments, the function of the inertial motion unit is to determine the orientation, angular velocity, and/or specific force of the electronic device in three-dimensional space 118. When included in the electronic device 100, the inertial motion unit can be used as an orientation sensor to measure the orientation of the device housing 101 in three-dimensional space 118. Similarly, the inertial motion unit can be used as an orientation sensor to measure the motion of the device housing 101 in three-dimensional space 118. The inertial motion unit can be used to make other measurements as well.

Illustrating by example, the inertial motion unit can determine the spatial orientation of the device housing 101 in three-dimensional space 118 by, for example, detecting a direction of gravity 119 using an accelerometer. In addition to, or instead of, an accelerometer, magnetometers can be included to detect the spatial orientation of the electronic device 100 relative to the earth's magnetic field. Similarly, one or more gyroscopes can be included to detect rotational orientation of the electronic device 100. Motion of the electronic device 100 can similarly be detected. Additionally, the accelerometers can be used to sense some of the gestures of the user, such as one talking with their hands, running, or walking.

In one or more embodiments, each inertial motion unit determines an orientation of the device housing 101 in which it is situated in three-dimensional space 118. For example, the inertial motion unit can be configured to determine an orientation, which can include measurements of azimuth, plumb, tilt, velocity, angular velocity, acceleration, and angular acceleration, of the device housing 101.

In other embodiments, rather than including an inertial motion unit, the one or more sensors 117 can include simpler devices that function as motion detectors. Illustrating by example, the one or more sensors 117 may include just a single accelerometer, a single gyroscope, or a combination thereof. For instance, an accelerometer may be embedded in the electronic circuitry of the electronic device 100 to show vertical orientation, constant tilt and/or whether the electronic device 100 is stationary in three-dimensional space 118. A gyroscope can be used in a similar fashion.

Regardless of the type of motion detectors that are used, they are operable to detect one or more of movement, and direction of movement, of the electronic device 100 by a user. These motion sensors can also be used to detect motion corresponding to a user's body or to human motion. This information can be used to determine that the electronic device 100 is proximately located with a user's body, such as is the case when the electronic device 100 is disposed or situated within a pocket.

Illustrating by example, in one embodiment when the electronic device 100 is placed within a pocket of clothing that a user is wearing, the motion detectors of the one or more sensors 117 can be used to detect predefined motions corresponding to human motion. These predefined motions can be small, and can include vibration, shaking, breathing, micromotions, and so forth. For instance, if the user is walking, the motion detectors can detect this movement. The one or more processors 108 can then extract parametric data from electronic signals delivered by these motion detectors in response to the user walking. By comparing the parametric data to a reference file stored in memory 113, the one or more processors 108 can identify the walking motion as corresponding to the motion of the user's body. The one or more processors 108 can use this information to distinguish the electronic device 100 being in a user's pocket compared to, for example, being in a drawer.

Similarly, if the user is simply sitting in a chair, the motion detectors can be used to detect body motions—even tiny ones—such as that of the user breathing. By comparing the parametric data extracted from this motion to a reference file stored in memory 113, the one or more processors 108 can identify the fact that the movement that the electronic device 100 is experiencing is due to the fact that the electronic device 100 is proximately located with a user's torso, limbs, head, or appendages, or otherwise generally disposed along the user body instead of, for example, being placed on a table. Other user motion that can be readily detected by parametric data includes motion associated with driving, riding a bike, or simply shifting in their seat. In one or more embodiments, the one or more processors 108 can conclude from these motions that the electronic device 100 is disposed near or on a person's body. The motion detectors can be used to detect other movement of the electronic device 100 as well. For example, in some embodiments a user can deliver gesture input by moving a hand or arm in predefined motions in close proximity to the electronic device 100.

Many of the one or more sensors 117 in the electronic device 100 can be used to detect movement, gestures, or other user input. For example, the one or more sensors 117 can include one or more proximity sensors can detect the gesture of a user waving a hand above the display 102. In another embodiment, the user can deliver gesture input by touching the display 102. In yet another embodiment, the accelerometer can detect gesture input from a user lifting, shaking, or otherwise deliberately moving the electronic device 100. In yet other embodiments, the user can deliver gesture input by rotating or changing the orientation of the electronic device 100, which can be detected by multiple accelerometers or a gyroscope.

The one or more sensors 117 can be used to confirm the electronic device 100 is disposed within a pocket in other ways as well. Illustrating by example, the one or more sensors 117 may determine that there is no touch input being delivered to any of the touch sensors or touch actuators 104, 105, 106, 107 while a temperature sensor determines there is approximately the same temperature at two different locations on the electronic device 100. From this information, in one or more embodiments the one or more processors 108 conclude that the electronic device (100) is disposed within a pocket.

Other sensors of the one or more sensors 117 can be used to confirm this conclusion in one or more embodiments. For example, the light sensor of the one or more sensors 117 may detect that direct light is not incident along the device housing 101, thereby confirming that the electronic device 100 is covered. A microphone of the one or more sensors 117 may detect the sound of clothing as the electronic device 100 slides into the pocket. A skin sensor of the one or more sensors 117 may detect that no skin is touching the device housing 101. The proximity sensor of the one or more sensors 117 may determine that the electronic device 100 is covered. A temperature sensor of the one or more sensors 117 can be used to determine temperatures of the ends of the electronic device 100. These each can provide a confirmation of the in-pocket condition, and can be used alone or in combination with other factors. Other techniques of determining whether the electronic device 100 is experiencing an in-pocket condition will be obvious to those of ordinary skill in the art having the benefit of this disclosure.

Other components 111 operable with the one or more processors 108 can include output components such as video outputs, audio outputs, and/or mechanical outputs. Examples of output components include audio outputs such as speaker port, earpiece speaker, or other alarms and/or buzzers and/or a mechanical output component such as vibrating or motion-based mechanisms. Still other components will be obvious to those of ordinary skill in the art having the benefit of this disclosure.

The other components 111 can also include an audio input/processor. The audio input/processor can include hardware, executable code, and speech monitor executable code in one embodiment. The audio input/processor can include, stored in memory 113, basic speech models, trained speech models, or other modules that are used by the audio input/processor to receive and identify voice commands that are received with audio input captured by an audio input/processor, one example of which is a microphone of the one or more sensors 117. In one embodiment, the audio input/processor can include a voice recognition engine. Regardless of the specific implementation utilized in the various embodiments, the audio input/processor can access various speech models to identify speech commands in one or more embodiments.

In one embodiment, the audio input/processor is configured to implement a voice control feature that allows the electronic device 100 to function as a voice assistant device, which may be configured as a voice assistant engine and may be actuated in response to actuation of touch actuator 105 in an explanatory embodiment. In one or more embodiments, the voice assistant engine is a digital assistant using voice recognition, speech synthesis, and natural language processing to receive audio input comprising a voice command from a source, determine the appropriate response to the voice command, and then deliver the response in the form of audio output in response to receiving the audio input from the source. When so configured, a user can cause the emanation of the audio input from their mouth to cause the one or more processors 108 of the electronic device 100 to execute a control operation.

In one or more embodiments, the one or more processors 108 can define one or more process engines, one example of which is function key manager 120. Such process engines can be a component of the one or more processors 108, operable with the one or more processors 108, defined by the one or more processors 108, and/or integrated into the one or more processors 108. Other configurations for these engines, including as software or firmware modules operable on the one or more processors 108, will be obvious to those of ordinary skill in the art having the benefit of this disclosure.

Where included, the process engines can be configured to determine assessed contexts and frameworks using adjustable algorithms of context assessment employing information, data, and events. These assessments may be learned through repetitive data analysis. Alternatively, a user may employ the user interface 103 to enter various parameters, constructs, rules, and/or paradigms that instruct or otherwise guide the process engines in detecting contextual information. The process engines can comprise an artificial neural network or other similar technology in one or more embodiments.

In one or more embodiments, the function key manager 120 is operable with the one or more processors 108. In some embodiments, the one or more processors 108 can control the function key manager 120. In other embodiments, the function key manager 120 can operate independently, delivering information gleaned from the touch actuator 105, the one or more sensors 117, and/or the other components 111, and other contextual information to the one or more processors 108. The function key manager 120 can receive data from the one or more sensors 117 in one or more embodiments. In one or more embodiments, the one or more processors 108 are configured to perform the operations of the function key manager 120.

In one or more embodiments, the function key manager 120 is operable with the one or more sensors 117, touch actuator 105, and optionally the one or more components 111. In addition to detecting actuation of the touch actuator 105, in one or more embodiments the function key manager 120 is operable with the one or more sensors 117 to determine whether a predefined function is occurring when touch actuator 105 is actuated. In one or more embodiments, when a predefined condition is detected when touch actuator 105 is actuated, the function key manager 120 precludes the execution of the control operation or device function assigned to the touch actuator 105. By contrast, in one or more embodiments when the predefined condition fails to occur when the touch actuator 105 is actuated, the function key manager 120 executes the control operation or device function assigned to the touch actuator 105 in response to the actuation of the touch actuator 105.

Under normal conditions, the function key manager 120 performs a method 121 of executing a predefined function assigned to touch actuator 105 in response to user actuation of touch actuator 105. For example, under normal conditions the function key manager 120 monitors touch actuator 105 for actuation. Where actuation of touch actuator 105 is detected, the function key manager 120 executes the predefined function assigned to the touch actuator 105. Thus, if touch actuator 105 is a physical voice assistant key, as is the case in the illustrative embodiment of FIG. 1, when the function key manager 120 detects user actuation of this physical voice assistant key, the function key manager 120 executes the voice assistant function of the electronic device 100.

However, as noted above, embodiments of the disclosure contemplate that a user may inadvertently actuate the touch actuator 105 when trying to actuate one of these other user interface controls, e.g., touch actuators 104, 106, 107. For instance, if the electronic device 100 is configured to capture a screen shot of the display 102 when touch actuator 107 and touch actuator 104 are simultaneously pressed, a user may inadvertently press touch actuator 107 and touch actuator 105 simultaneously. This accidental miss of touch actuator 104 and actuation of touch actuator 105 may launch a voice assistant function instead of capturing the screen shot. Where the user was attempting to capture, for example, a picture of their best friend, Buster, during a funny moment in a videoconference, the user may become frustrated at the loss of this moment with no picture. This frustration can be compounded when that same videoconference is interrupted by the voice assistant function.

Advantageously, the electronic device 100 of FIG. 1 helps to eliminate such frustrations. To wit, the function key manager 120 determines whether at least one predefined condition is occurring concurrently with the actuation of the touch actuator 105. Examples of such predefined conditions include the actuation of the touch actuator 105 exceeding a predefined duration threshold, the electronic device 100 being in a pocket when the touch actuator 105 is actuated, actuation of another touch actuator, e.g., touch actuator 107, occurring concurrently with the actuation of the touch actuator 105, the electronic device 100 being oriented in a landscape orientation in three-dimensional space 118, the electronic device 100 being oriented in a landscape orientation in the three-dimensional space 118 with the touch actuator 105 being positioned on the bottom of the electronic device 100 relative to the direction of gravity 119, and so forth. These predefined conditions are illustrative only, as others will be readily obvious to those of ordinary skill in the art having the benefit of this disclosure.

In one or more embodiments, when the predefined condition is occurring while the touch actuator 105 is actuated, the function key manager 120 of the electronic device 100 precludes the execution of the predefined function associated with, and ordinarily responsive to, actuation of the touch actuator 105. Alternatively, when the predefined condition is occurring while the touch actuator 105 is actuated, the function key manager 120 precludes initiation of the function associated with, and otherwise responsive to, actuation of the touch actuator 105.

Illustrating by example, in the illustrative and explanatory embodiment of FIG. 1, touch actuator 105 is configured as a physical key situated along a minor face, here the right side, of the electronic device 100. Additionally, the touch actuator 105 is universally associated with a voice assistant function, such that actuation of the touch actuator 105 ordinarily executes a voice assistant function as shown at method 121.

In one or more embodiments, the function key manager 120 determines whether a predefined condition occurs concurrently with, or within a predefined duration of, actuation of this physical voice assistant key. In one or more embodiments, when the predefined condition occurs concurrently with, or within the predefined duration of, the actuation of this physical voice assistant key, the function key manager 120 precludes the execution of the voice assistant function of the electronic device 100. By contrast, when the predefined condition fails to occur concurrently with, or within the predefined duration of, actuation of this physical voice assistant key, the function key manager 120 executes the voice assistant function.

In one or more embodiments, this execution of the voice assistant function occurs only after touch actuator 105 is released. By actuating the predefined function at the release of the touch actuator 105, rather than at the onset of actuation, the function key manager 120 helps to prevent false actuation of the voice assistant function.

Details of the various predefined conditions and mechanisms for precluding execution or initiation of the predefined function assigned to the touch actuator 105 will be described in more detail below with reference to FIGS. 3-6, which are incorporated by reference into FIG. 1 in the event that the claims are restricted by figure. It is to be understood that FIG. 1 is provided for illustrative purposes only and for illustrating components of one electronic device 100 in accordance with embodiments of the disclosure and is not intended to be a complete schematic diagram of the various components required for an electronic device. Therefore, other electronic devices in accordance with embodiments of the disclosure may include various other components not shown in FIG. 1 or may include a combination of two or more components or a division of a particular component into two or more separate components, and still be within the scope of the present disclosure.

Figure 2:
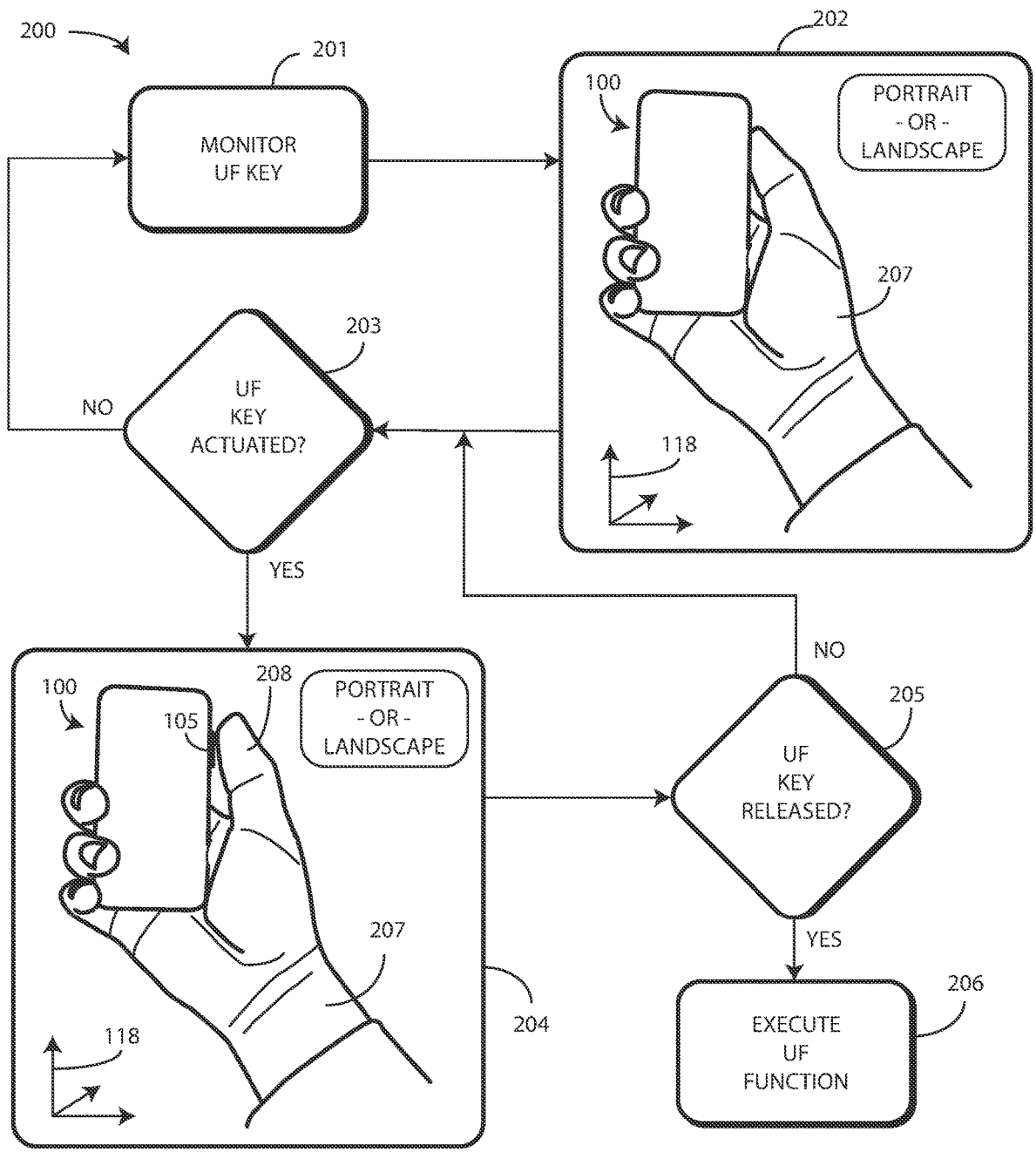
FIG. 2 illustrates one explanatory method in accordance with one or more embodiments of the disclosure.

Turning now to FIG. 2, illustrated therein is one explanatory method 200 of using the electronic device 100 of FIG. 1, or another similarly configured electronic device in accordance with embodiments of the disclosure. The method 200 of FIG. 2 is a variant of the method (121) performed by the function key manager (120) during normal conditions as described above with reference to FIG. 1.

The function key manager (120) could equally perform the method (200) of FIG. 2. Since the function key manager (120) is a process engine of the one or more processors (108) of the electronic device 100, reference will generally be made to the one or more processors (108) when discussing the method 200 of FIG. 2. A similar convention will be used in the discussion of FIGS. 3-6 that follows. Moreover, as indicated at steps 202 and 204, the method 200 of FIG. 2 functions in the same manner regardless of whether the electronic device 100 is oriented in the portrait mode in three-dimensional space 118 or in the landscape mode in three-dimensional space 118.

Beginning at step 201, the one or more processors (108) of the electronic device 100 monitor for actuation of a touch actuator 105 of the electronic device 100. In one or more embodiments, the touch actuator 105 has a predefined function responsive thereto. In one or more embodiments, the predefined function is that of a voice assistant function. In the illustrative embodiment of FIG. 2, the touch actuator 105 comprises a physical key of the electronic device 100.

As shown at step 202, a user 207 actuates the touch actuator 105 by pressing the physical key defining the touch actuator 105. At decision 203, the one or more processors (108) of the electronic device 100 detect this actuation of the touch actuator 105. Since actuation occurs at step 202, the method proceeds from decision 203 to step 204. Had no actuation of the touch actuator 105 occurred at step 202, the method 200 would have returned from decision 203 to step 201 so that the one or more processors (108) could continue to monitor the touch actuator 105.

As shown at step 204, the user 207 then releases the touch actuator 105 by lifting a thumb 208 from the exterior surface of the touch actuator 105. At decision 205, the one or more processors (108) of the electronic device 100 determine whether the touch actuator 105 has been released. Since it has, the method 200 moves to step 206 where the predefined function, which is a voice assistant function in this illustration, is executed. Had the user 207 not released the thumb 208 from the touch actuator 105 at step 204, in one or more embodiments the method 200 would have returned from decision 205 to decision 203.

The method 200 of FIG. 2 differs slightly from the method (121) of FIG. 1 in that execution of the predefined function assigned to the touch actuator 105 occurs when the touch actuator 105 is released, rather than when it is actuated. While this was an option in the method (121) of FIG. 1, FIG. 2 employs this "execute on release" feature to help prevent false triggering of the predefined function. Said differently, in the method 200 of FIG. 2, the one or more processors (108) of the electronic device 100 detect the release of the touch actuator 105 of the electronic device 100, with the execution of the predefined function associated with the touch actuator 105 occurring in response to the release of the touch actuator 105 of the electronic device 100.

Illustrating by example, if the user 207 is holding the electronic device 100 and watching a video, while their thumb 208 is inadvertently resting on the touch actuator 105, delaying actuation of the voice assistant function until the touch actuator 105 is released will delay the initiation of the voice assistant function rather than causing the same to commence as soon as the touch actuator 105 is pressed. This can result in the voice assistant function not being launched until the user 207 has finished watching the video. Accordingly, in one or more embodiments the one or more processors (108) execute or initiate a predefined function responsive to actuation of a touch actuator 105 only when that touch actuator 105 is released, i.e., when the actuation operation terminates.

Figure 3:
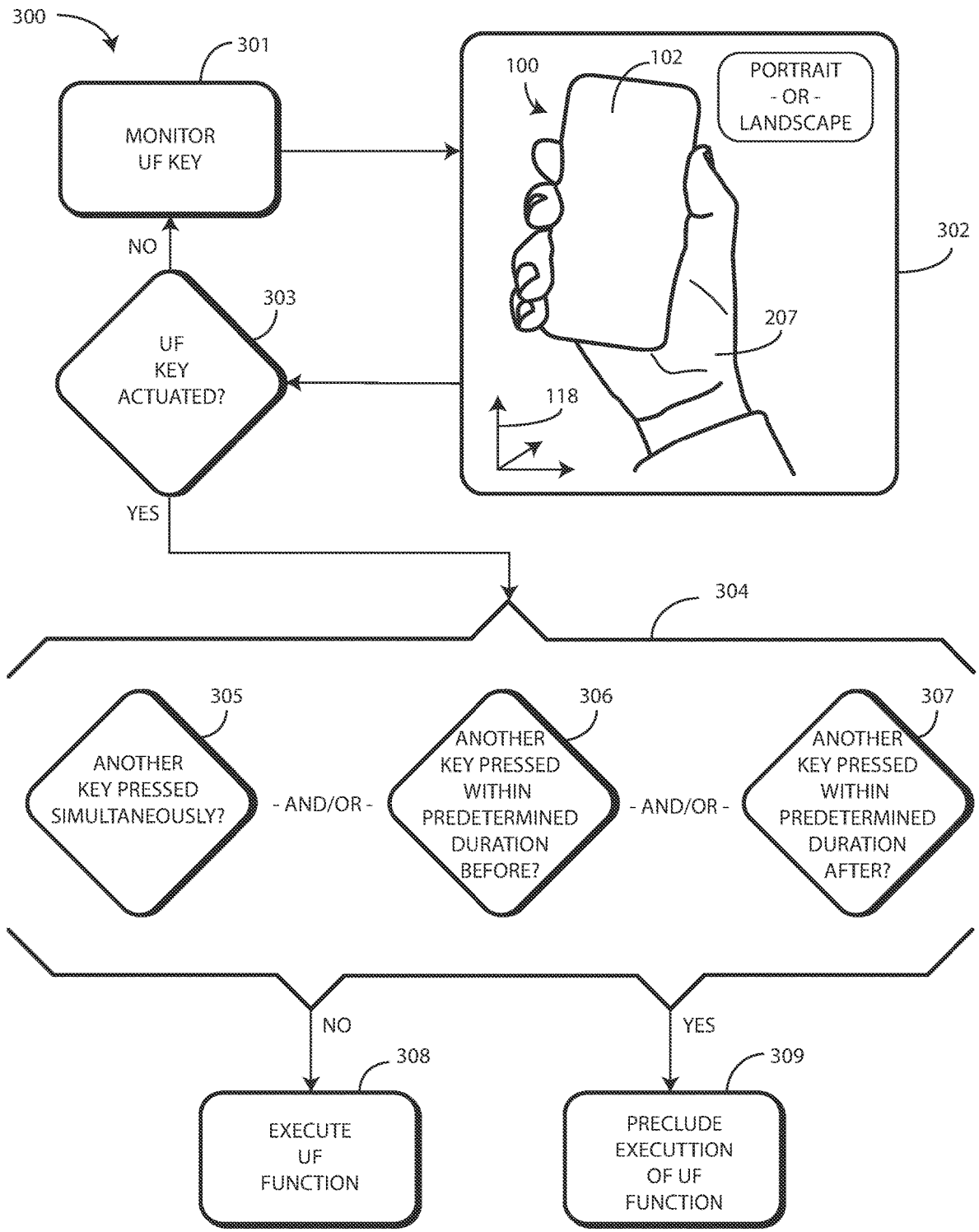
FIG. 3 illustrates another explanatory method in accordance with one or more embodiments of the disclosure.

Turning now to FIG. 3, illustrated therein is a method 300 of precluding the execution, initiation, and/or performance of a predefined function assigned to a touch actuator (105)

in accordance with one or more embodiments of the disclosure. The method 300 of FIG. 3 precludes the execution of this predefined function associated with, and ordinarily responsive to, the touch actuator (105) when a predefined condition is occurring concurrently with the actuation of the touch actuator (105). Three examples of predefined conditions are shown in the method 300 of FIG. 3. Others will be discussed below. Still others will be obvious to those of ordinary skill in the art having the benefit of this disclosure. As with the method (200) of FIG. 2, the method 300 of FIG. 3 functions in the same manner regardless of whether the electronic device 100 is in the portrait orientation in three-dimensional space 118 or is in the landscape orientation in three-dimensional space 118.

Beginning at step 301, the one or more processors (108) of the electronic device 100 monitor for actuation of a touch actuator (105) of the electronic device 100. As before, the touch actuator (105) has a predefined function responsive thereto. In one or more embodiments, the predefined function is that of a voice assistant function, with the touch actuator (105) defining a physical voice assistant key. In other embodiments, the predefined function comprises a user-defined function. In still other embodiments, the predefined function comprises a user-defined, universal function as previously described.

In the illustrative embodiment of FIG. 3, the touch actuator (105) comprises a physical key of the electronic device 100. As shown at step 302, the user 207 actuates the touch actuator (105) by pressing the physical key defining the touch actuator (105). At decision 303, the one or more processors (108) of the electronic device 100 detect this actuation of the touch actuator (105). Since actuation occurs at step 302, the method 300 proceeds from decision 303 to a step 304 of determining whether at least one predefined condition is occurring concurrently with the actuation of the touch actuator (105) of the electronic device 100. Had no actuation of the touch actuator 105 occurred at step 302, the method 300 would have returned from decision 303 to step 301 so that the one or more processors (108) could continue to monitor the touch actuator (105).

Step 304 comprises the one or more processors (108) determining, optionally by using one or more sensors (117) of the electronic device 100, whether at least one predefined condition is occurring concurrently with the actuation of the touch actuator (105) of the electronic device 100 occurring at step 302. Three different predefined conditions are illustrated as sub-elements of step 304. These predefined conditions could be monitored for, and detected, alone or in combination.

Decision 305 determines whether another touch actuator of the electronic device 100 is actuated while touch actuator (105) is being actuated. As noted above in the discussion of FIG. 1, some electronic devices are configured to capture screen shots of the display 102 when two touch actuators are simultaneously actuated. Illustrating by example, in one or more embodiments a screen shot can be captured when a volume actuator (touch actuator 106 or touch actuator 107 of FIG. 1) and a power actuator (touch actuator 104) are simultaneously actuated.

Embodiments of the disclosure contemplate that the user 207 may become frustrated if they intend to press the two designated touch actuators required to capture the screen shot, and inadvertently actuate touch actuator (105) instead. Accordingly, decision 305 detects whether another touch actuator, e.g., a volume actuator, power actuator, or other control mechanism, is being actuated concurrently with the actuation of touch actuator 105. Where it occurs, i.e., when the at least one predefined condition of actuation of another touch actuator of the electronic device 100 is occurring concurrently with the actuation of the touch actuator 105 associated with the predefined function, in one or more embodiments the one or more processors (108) of the electronic device 100 conclude that this is due to an inadvertent error.

Accordingly, at step 309 the one or more processors (108) of the electronic device 100 preclude the execution of the predefined function associated with touch actuator 105. By contrast, when the predefined condition fails to occur concurrently with the actuation of touch actuator 105, the one or more processors (108) of the electronic device 100 execute the predefined function in response to the actuation of the touch actuator 105 at step 308.

Decision 306 determines whether another touch actuator is actuated prior to, but within a predefined duration (such as a few seconds) of, the actuation of touch actuator (105). Said differently, decision 306 determines whether touch actuator 105 is actuated after, but within a predefined duration of, the actuation of another touch actuator, e.g., a volume actuator or a power actuator. In one or more embodiments, the method 300 of FIG. 3 ignores the actuation of touch actuator 105 when this is the case.

Accordingly, at step 309 the one or more processors (108) of the electronic device 100 preclude the execution of the predefined function associated with touch actuator 105. By contrast, when the predefined condition fails to occur concurrently with the actuation of touch actuator 105, the one or more processors (108) of the electronic device 100 execute the predefined function in response to the actuation of the touch actuator 105 at step 308.

Decision 307 determines whether another touch actuator is actuated after, but within a predefined duration (such as a few seconds) of, the actuation of touch actuator (105). Said differently, decision 307 determines whether touch actuator 105 is actuated prior to, but within a predefined duration of, the actuation of another touch actuator, e.g., a volume actuator or a power actuator. In one or more embodiments, the method 300 of FIG. 3 ignores the actuation of touch actuator (105) when this is the case.

Accordingly, at step 309 the one or more processors (108) of the electronic device 100 preclude the execution of the predefined function associated with touch actuator 105. By contrast, when the predefined condition fails to occur concurrently with the actuation of touch actuator 105, the one or more processors (108) of the electronic device 100 execute the predefined function in response to the actuation of the touch actuator 105 at step 308.

Figure 4:
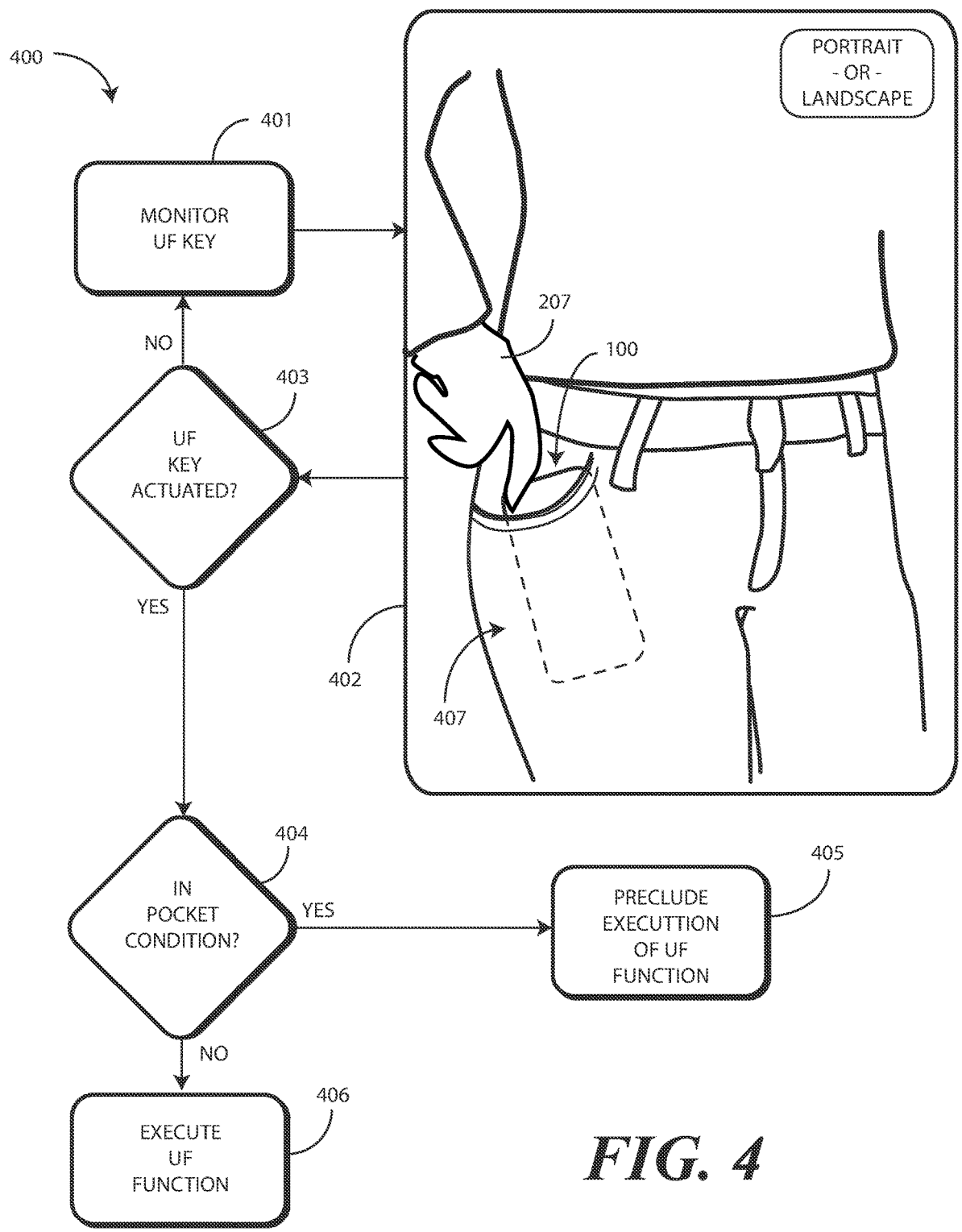
FIG. 4 illustrates still another explanatory method in accordance with one or more embodiments of the disclosure.

Turning now to FIG. 4, illustrated therein is another method 400 of precluding the execution, initiation, and/or performance of a predefined function assigned to a touch actuator (105) when a predefined condition occurs concurrently with actuation of the touch actuator (105) in accordance with one or more embodiments of the disclosure. The method 400 of FIG. 4 precludes the execution of this predefined function associated with, and ordinarily responsive to, the touch actuator (105) when the electronic device 100 is in an in-pocket condition when the actuation of the touch actuator (105) occurs. As with the method (200) of FIG. 2 and the method (300) of FIG. 3, the method 400 of FIG. 4 functions in the same manner regardless of whether the electronic device 100 is in the portrait orientation in three-dimensional space (118) or is in the landscape orientation in three-dimensional space (118).

Beginning at step 401, the one or more processors (108) of the electronic device 100 monitor for actuation of a touch actuator (105) of the electronic device 100. As before, the touch actuator (105) has a predefined function responsive thereto. In one or more embodiments, the predefined function is that of a voice assistant function, with the touch actuator (105) defining a physical voice assistant key. In other embodiments, the predefined function comprises a user-defined function. In still other embodiments, the predefined function comprises a user-defined, universal function as previously described.

As shown at step 402, the user 207 inadvertently actuates the touch actuator (105) while the electronic device 100 is in an in-pocket condition 407. Embodiments of the disclosure contemplate that the user 207 will rarely wish for a predefined function such as a voice assistant function to commence while the electronic device 100 is in the in-pocket condition 407. Accordingly, in one or more embodiments, actuation of the touch actuator (105) is ignored when this situation arises.

At decision 403, the one or more processors (108) of the electronic device 100 detect this actuation of the touch actuator (105). Since actuation of the touch actuator (105) inadvertently occurs at step 402, the method 400 proceeds from decision 403 to a step 404 of determining whether at least one predefined condition is occurring concurrently with the actuation of the touch actuator (105) of the electronic device 100. In this example, the at least one predefined condition comprises the in-pocket condition 407. Had no actuation of the touch actuator (105) occurred at step 402, the method 400 would have returned from decision 403 to step 401 so that the one or more processors (108) could continue to monitor the touch actuator (105).

Step 404 comprises the one or more processors (108) determining, optionally by using one or more sensors (117) of the electronic device 100, whether at least one predefined condition is occurring concurrently with the actuation of the touch actuator (105) of the electronic device 100 occurring at step 402. Here, it clearly is, as the electronic device 100 is in the in-pocket condition 407 when the touch actuator (105) is actuated.

Accordingly, at step 405 the one or more processors (108) of the electronic device 100 preclude the execution of the predefined function associated with touch actuator (105). Had the predefined condition failed to occur concurrently with the actuation of touch actuator (105) at step 402, the one or more processors (108) of the electronic device 100 execute the predefined function in response to the actuation of the touch actuator (105) at step 406.

Figure 5:
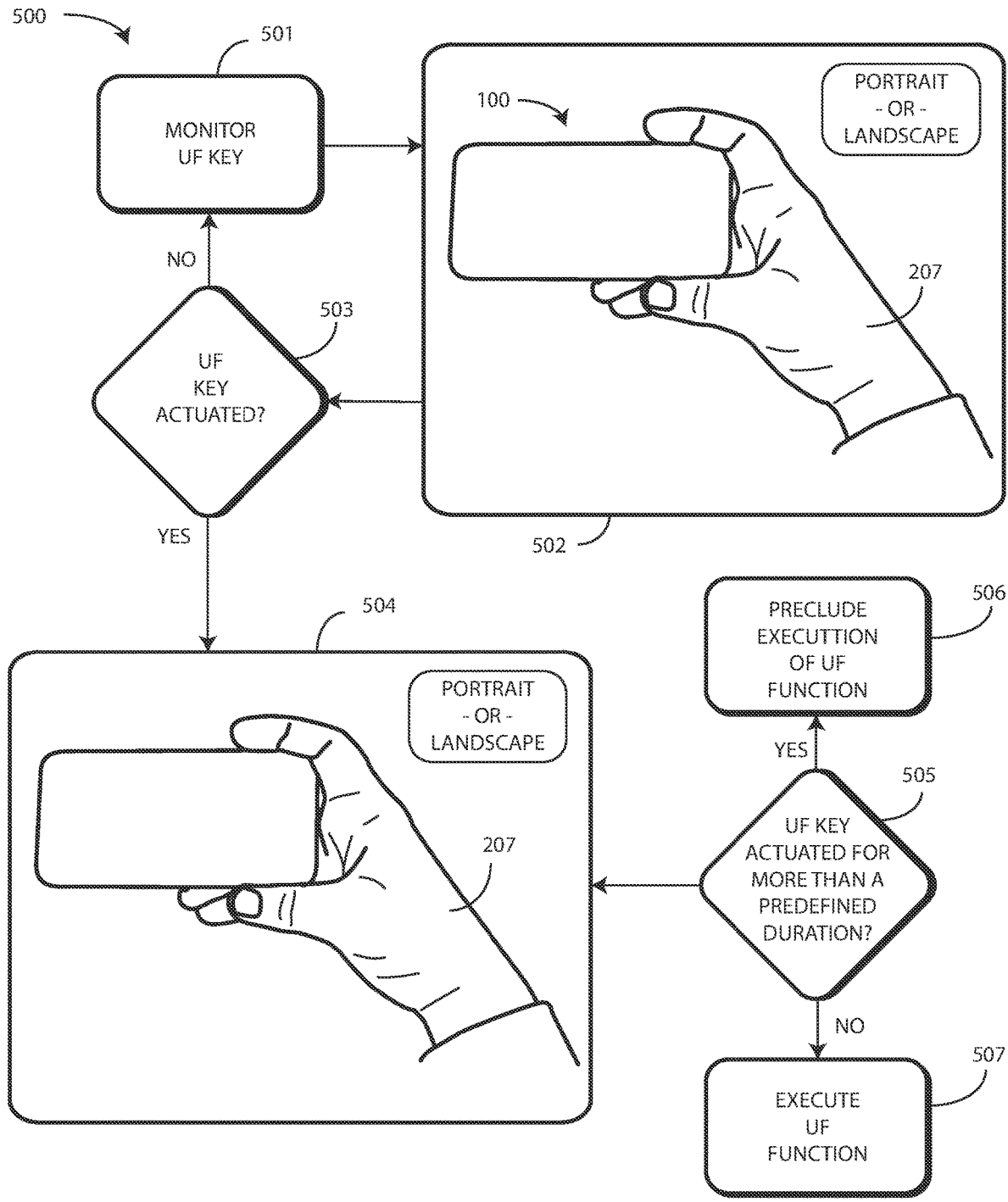
FIG. 5 illustrates yet another explanatory method in accordance with one or more embodiments of the disclosure.

Turning now to FIG. 5, illustrated therein is another method 500 of precluding the execution, initiation, and/or performance of a predefined function assigned to a touch actuator (105) when a predefined condition occurs concurrently with actuation of the touch actuator (105) in accordance with one or more embodiments of the disclosure. The method 500 of FIG. 5 precludes the execution of this predefined function associated with, and ordinarily responsive to, the touch actuator (105) when the actuation of the touch actuator (105) occurs for too long a time. Embodiments of the disclosure contemplate that a user 207 wishing to initiate, for example, a voice assistant function would press the touch actuator (105) and release it. Holding the touch actuator (105) for more than, say three or four seconds may therefore be inadvertent and simply due to the user's grip of the electronic device 100. Accordingly, the method 500 of FIG. 5 ignores such long presses. As with the method (200) of FIG. 2, the method (300) of FIG. 3, and the method (400) of FIG. 4, the method 500 of FIG. 5 functions in the same manner regardless of whether the electronic device 100 is in the portrait orientation in three-dimensional space (118) or is in the landscape orientation in three-dimensional space (118).

Beginning at step 501, the one or more processors (108) of the electronic device 100 monitor for actuation of a touch actuator (105) of the electronic device 100. As before, the touch actuator (105) has a predefined function responsive thereto. In one or more embodiments, the predefined function is that of a voice assistant function, with the touch actuator (105) defining a physical voice assistant key. In other embodiments, the predefined function comprises a user-defined function. In still other embodiments, the predefined function comprises a user-defined, universal function as previously described.

As shown at step 502, the user 207 inadvertently actuates the touch actuator (105) while simply holding the electronic device 100. Illustrating by example, since the electronic device 100 is shown oriented in the landscape orientation in three-dimensional space (118), it may be that the user 207 is watching a video. While doing so, the user 207 may simply inadvertently touch, squeeze, press, or otherwise interact with the touch actuator (105).

Embodiments of the disclosure contemplate that the user 207 will rarely wish for a predefined function, such as a voice assistant function, to commence while watching a video. Moreover, embodiments of the disclosure contemplate that when the user 207 wants to initiate the voice assistant function or another user-defined function or user-defined, universal function, the user 207 will simple touch and release the touch actuator (105) so that initiation can quickly commence. Accordingly, in one or more embodiments, actuation of the touch actuator (105) is ignored when it occurs for too long a time, i.e., beyond a predefined duration threshold.

At decision 503, the one or more processors (108) of the electronic device 100 detect this actuation of the touch actuator (105). Since actuation of the touch actuator (105) is still occurring at step 504, the method 500 proceeds from decision 503 to decision 505. Had the actuation of the touch actuator (105) not continued beyond the predefined duration threshold at step 504, the method 500 would have returned from decision 503 to step 501 so that the one or more processors (108) could continue to monitor the touch actuator (105).

Decision 505 determines whether at least one predefined condition is occurring concurrently with the actuation of the touch actuator (105) of the electronic device 100. In this example, the at least one predefined condition comprises the actuation of the touch actuator (105) occurring for too long. Said differently, decision 505 determines whether the actuation of the touch actuator of the electronic device exceeds a predefined duration threshold. Here it is, as the touch actuator (105) is initially actuated at step 502 and continues to be actuated at step 504 while the user 207 watches the video.

Accordingly, at step 506 the one or more processors (108) of the electronic device 100 preclude the execution of the predefined function associated with touch actuator (105). Had the predefined condition failed to occur concurrently with the actuation of touch actuator (105) at step 504, the one or more processors (108) of the electronic device 100 execute the predefined function in response to the actuation of the touch actuator (105) at step 507.

Figure 6:
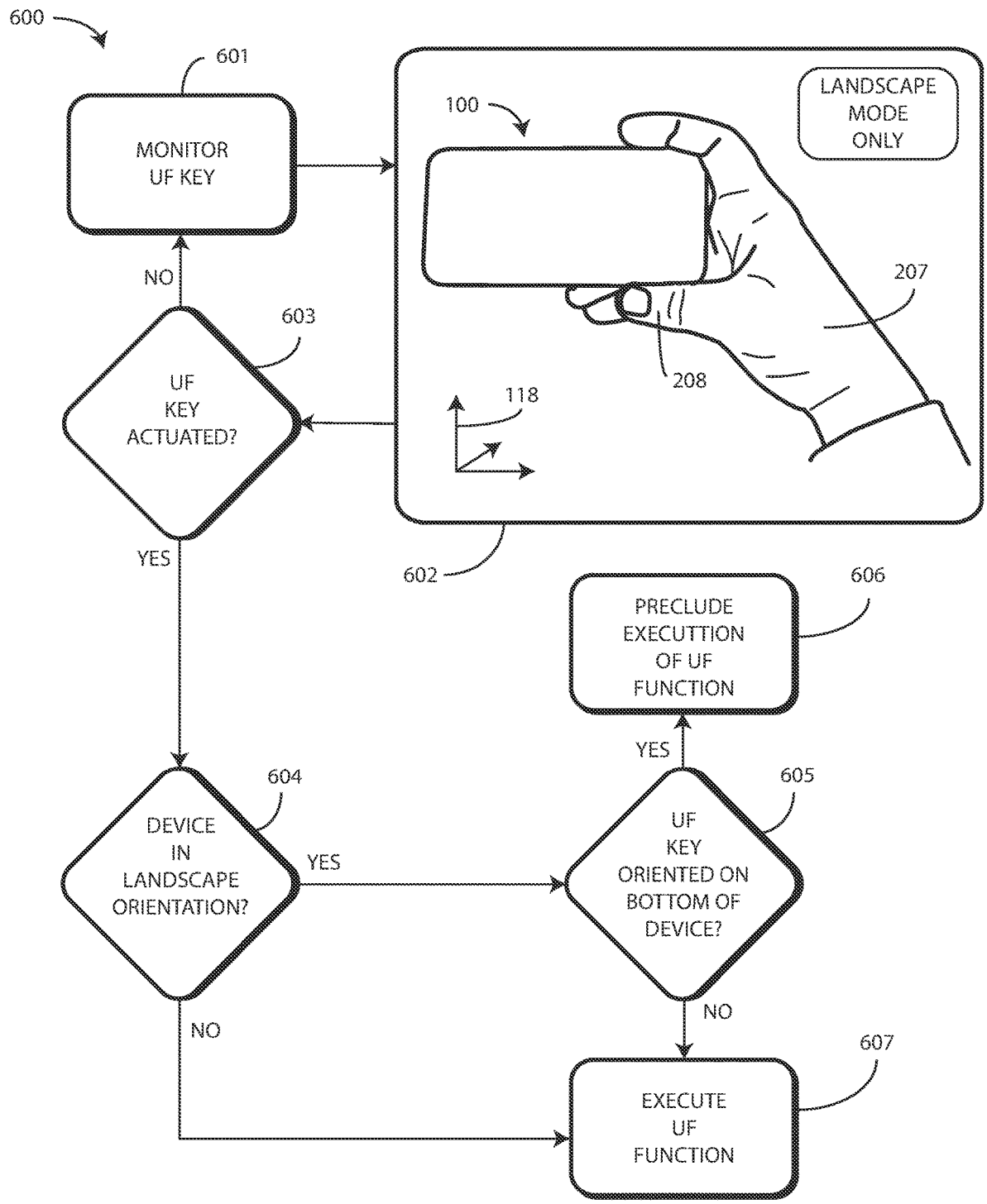
FIG. 6 illustrates another explanatory method in accordance with one or more embodiments of the disclosure.

Turning now to FIG. 6, illustrated therein is another method 600 of precluding the execution, initiation, and/or performance of a predefined function assigned to a touch actuator (105) when a predefined condition occurs concurrently with actuation of the touch actuator (105) in accordance with one or more embodiments of the disclosure. The method 600 of FIG. 6 precludes the execution of this predefined function associated with, and ordinarily responsive to, the touch actuator (105) when the actuation of the touch actuator (105) occurs for too long a time.

Embodiments of the disclosure contemplate that a user 207 wishing to initiate, for example, a voice assistant function would press the touch actuator (105) and release it. Holding the touch actuator (105) for more than, say three or four seconds may therefore be inadvertent and simply due to the user's grip of the electronic device 100. Accordingly, the method 500 of FIG. 5 ignores such long presses. As with the method (200) of FIG. 2, the method (300) of FIG. 3, and the method (400) of FIG. 4, the method 500 of FIG. 5 functions in the same manner regardless of whether the electronic device 100 is in the portrait orientation in three-dimensional space (118) or is in the landscape orientation in three-dimensional space (118).

Beginning at step 501, the one or more processors (108) of the electronic device 100 monitor for actuation of a touch actuator (105) of the electronic device 100. As before, the touch actuator (105) has a predefined function responsive thereto. In one or more embodiments, the predefined function is that of a voice assistant function, with the touch actuator (105) defining a physical voice assistant key. In other embodiments, the predefined function comprises a user-defined function. In still other embodiments, the predefined function comprises a user-defined, universal function as previously described.

As shown at step 502, the user 207 inadvertently actuates the touch actuator (105) while simply holding the electronic device 100. Illustrating by example, since the electronic device 100 is shown oriented in the landscape orientation in three-dimensional space (118), it may be that the user 207 is watching a video. While doing so, the user 207 may simply inadvertently touch, squeeze, press, or otherwise interact with the touch actuator (105).

Embodiments of the disclosure contemplate that the user 207 will rarely wish for a predefined function, such as a voice assistant function, to commence while watching a video. Moreover, embodiments of the disclosure contemplate that when the user 207 wants to initiate the voice assistant function or another user-defined function or user-defined, universal function, the user 207 will simple touch and release the touch actuator (105) so that initiation can quickly commence. Accordingly, in one or more embodiments, actuation of the touch actuator (105) is ignored when it occurs for too long a time, i.e., beyond a predefined duration threshold.

At decision 503, the one or more processors (108) of the electronic device 100 detect this actuation of the touch actuator (105). Since actuation of the touch actuator (105) is still occurring at step 504, the method 500 proceeds from decision 503 to decision 505. Had the actuation of the touch actuator (105) not continued beyond the predefined duration threshold at step 504, the method 500 would have returned from decision 503 to step 501 so that the one or more processors (108) could continue to monitor the touch actuator (105).

Decision 505 determines whether at least one predefined condition is occurring concurrently with the actuation of the touch actuator (105) of the electronic device 100. In this example, the at least one predefined condition comprises the actuation of the touch actuator (105) occurring for too long. Said differently, decision 505 determines whether the actuation of the touch actuator of the electronic device exceeds a predefined duration threshold. Here it is, as the touch actuator (105) is initially actuated at step 502 and continues to be actuated at step 504 while the user 207 watches the video.

Accordingly, at step 506 the one or more processors (108) of the electronic device 100 preclude the execution of the predefined function associated with touch actuator (105). Had the predefined condition failed to occur concurrently with the actuation of touch actuator (105) at step 504, the one or more processors (108) of the electronic device 100 execute the predefined function in response to the actuation of the touch actuator (105) at step 507.

Turning now to FIG. 6, illustrated therein is yet another method 600 of precluding the execution, initiation, and/or performance of a predefined function assigned to a touch actuator (105) when a predefined condition occurs concurrently with actuation of the touch actuator (105) in accordance with one or more embodiments of the disclosure. The method 600 of FIG. 6 precludes the execution of this predefined function associated with, and ordinarily responsive to, the touch actuator (105) when both (1) the electronic device 100 is oriented in the landscape orientation in three-dimensional space 118 and (2) the actuation of the touch actuator (105) occurs while the touch actuator (105) is oriented beneath the electronic device 100 in three-dimensional space 118.

Embodiments of the disclosure contemplate that a user 207 holds the electronic device 100 in the landscape orientation, frequently the user 207 will place their thumb 208 under the electronic device 100 to support the electronic device 100 against gravity as shown at step 602. When this is the case, the probability of the user 207 inadvertently actuating the touch actuator (105) greatly increases. Accordingly, in one or more embodiments the method 600 of FIG. 6 ignores actuation of the touch actuator (105) when the predefined condition occurring when the touch actuator (105) is actuated comprises (1) a landscape orientation of the electronic device 100 in three-dimensional space 118 and (2) the touch actuator (105) is oriented beneath the electronic device 100 in three-dimensional space 118. In contrast to the method (200) of FIG. 2, the method (300) of FIG. 3, the method (400) of FIG. 4, and the method (500) of FIG. 5, the method 600 of FIG. 6 functions only when the electronic device 100 is in the landscape orientation in three-dimensional space 118.

Beginning at step 601, the one or more processors (108) of the electronic device 100 monitor for actuation of a touch actuator (105) of the electronic device 100. As before, the touch actuator (105) has a predefined function responsive thereto. In one or more embodiments, the predefined function is that of a voice assistant function, with the touch actuator (105) defining a physical voice assistant key. In other embodiments, the predefined function comprises a user-defined function. In still other embodiments, the predefined function comprises a user-defined, universal function as previously described.

As shown at step 602, the user 207 inadvertently actuates the touch actuator (105) while simply holding the electronic device 100 in the landscape orientation in three-dimensional space 118 with their thumb 208 positioned beneath the electronic device 100 in three-dimensional space 118. This might occur, for example, when the user 207 is watching a video while holding the electronic device 100 in the landscape orientation in three-dimensional space (118) with their thumb 208 supporting the weight of the electronic device 100. This can easily result in an inadvertent touch, squeeze, press, or other interaction with the touch actuator (105).

At decision 603, the one or more processors (108) of the electronic device 100 detect this actuation of the touch actuator (105). Decision 604 then determines whether the electronic device 100 is oriented in the landscape orientation. Decision 605 determines whether the touch actuator (105) is oriented beneath the electronic device 100 in three-dimensional space 118. Where it is, the one or more processors (108) of the electronic device 100 preclude the execution of the predefined function associated with touch actuator (105) at step 606. Had this illustrative predefined condition failed to occur concurrently with the actuation of touch actuator (105) at step 602, the one or more processors (108) of the electronic device 100 would execute the predefined function in response to the actuation of the touch actuator (105) at step 607.

It should be noted that the methods of FIGS. 2-6 can be used alone or in combination. Accordingly, when considered in conjunction with the hardware and software components described above with reference to FIG. 1, embodiments of the disclosure provide an electronic device 100 that includes a device housing 101 supporting a touch actuator 105 operable to initiate a predefined or a user-defined, universal function of the electronic device 100. The electronic device 100 can also include at least one other touch actuator 104, 106, 107 operable to initiate at least one other function of the electronic device, such as powering the electronic device 100 ON or OFF or adjusting the volume of an audio output up or down.

In one or more embodiments, one or more processors 108 are operable with the touch actuator 105 and the at least one other touch actuator 104, 106, 107. In one or more embodiments, the one or more processors 108 preclude initiation of the predefined or user-defined, universal function of the electronic device 100 when a predefined condition occurs while the touch actuator 105 is actuated.

The predefined condition can vary. In one or more embodiments, the predefined condition comprises actuation of the touch actuator 105 concurrently with, or within a predefined duration of, actuation of the at least one other touch actuator 104, 106, 107. In other embodiments, the predefined condition comprises an in-pocket condition 407 of the electronic device 100.

In still other embodiments, the predefined condition comprises the electronic device 100 being positioned in a landscape orientation with the touch actuator 105 positioned beneath the electronic device in three-dimensional space 118. In still other embodiments, the predefined condition comprises actuation of the touch actuator 105 exceeding a predefined actuation duration threshold. In explanatory embodiments used for illustration above, the user-defined, universal function comprises a voice assistant function.

Figure 7:
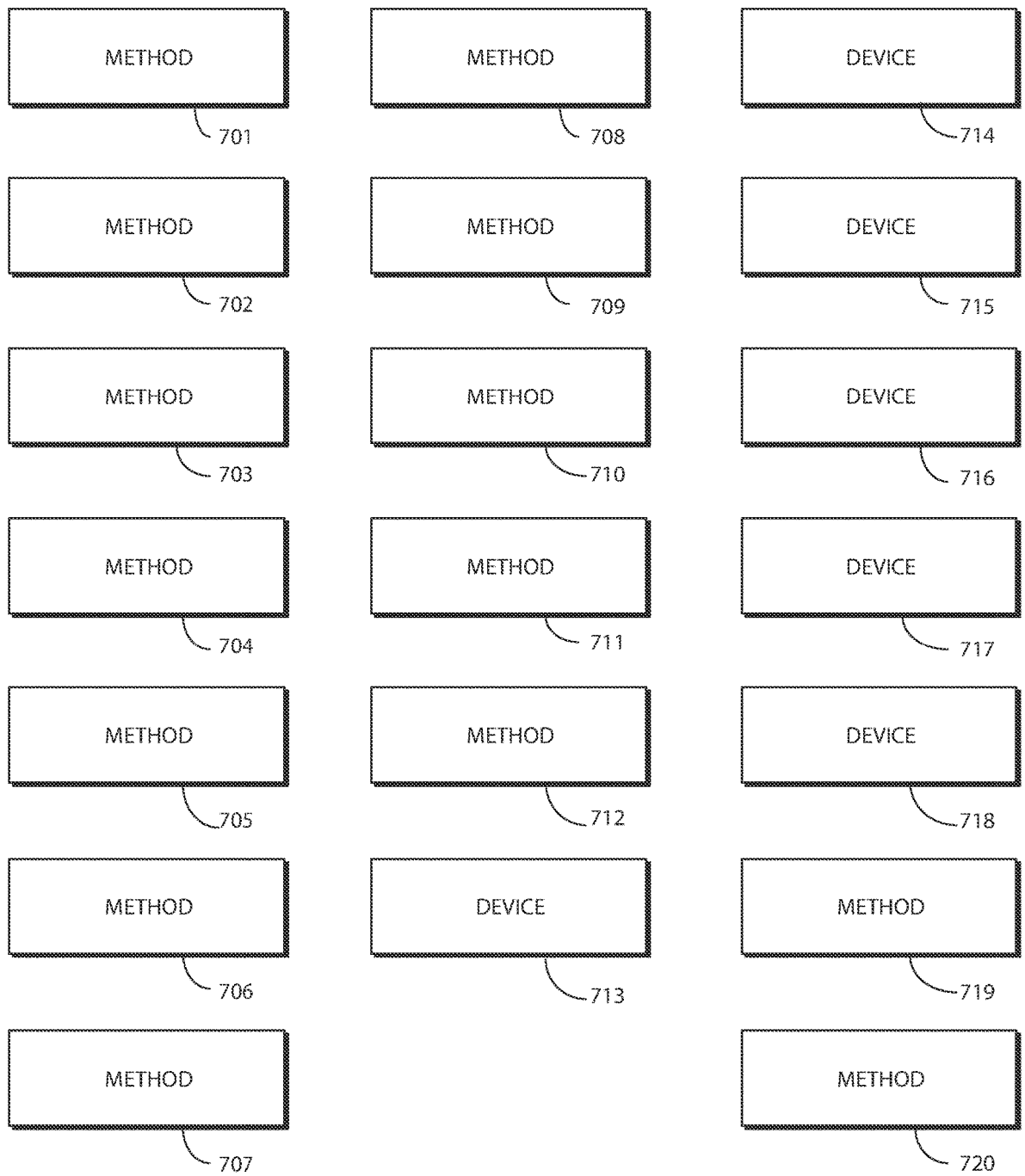
FIG. 7 illustrates various embodiments of the disclosure.

Turning now to FIG. 7, illustrated therein are various embodiments of the disclosure. The embodiments of FIG. 7 are shown as labeled boxes in FIG. 7 due to the fact that the individual components of these embodiments have been illustrated in detail in FIGS. 1-6, which precede FIG. 7. Accordingly, since these items have previously been illustrated and described, their repeated illustration is no longer essential for a proper understanding of these embodiments. Thus, the embodiments are shown as labeled boxes.

At 701, a method in an electronic device comprises detecting, with one or more processors, actuation of a touch actuator of the electronic device having a predefined function responsive thereto. At 701, the method comprises determining, by the one or more processors, whether at least one predefined condition is occurring concurrently with the actuation of the touch actuator of the electronic device. At 701, and when the at least one predefined condition is occurring concurrently with the actuation of the touch actuator of the electronic device, the method comprises precluding, by the one or more processors, execution of the predefined function in response to the actuation of the touch actuator of the electronic device.

At 702, the predefined condition of 701 comprises actuation of another touch actuator of the electronic device. At 703, the predefined function of 701 comprises a voice assistant function.

At 704, the other touch actuator of 702 comprises a volume actuator of the electronic device. At 705, the other touch actuator of 702 comprises a power actuator of the electronic device.

At 706, the predefined function of 701 comprises the actuation of the touch actuator of the electronic device exceeding a predefined duration threshold. At 707, the predefined function of 701 comprises an in-pocket condition of the electronic device.

At 708, the predefined function of 701 comprises a landscape orientation of the electronic device. At 709, the predefined function of 708 further comprises the touch actuator being oriented beneath the electronic device in three-dimensional space.

At 710, the method of 701 further comprises, when the at least one predefined condition fails to occur concurrently with the actuation of the electronic device, executing, by the one or more processors, the predefined function. At 711, the method of 710 further comprises detecting, by the one or more processors, release of the touch actuator of the electronic device. At 711, the executing, by the one or more processors, the predefined function of 710 occurs in response to the release of the touch actuator of the electronic device. At 712, the touch actuator of 711 comprises a physical key of the electronic device.

At 713, an electronic device comprises a device housing supporting a touch actuator operable to initiate a user-defined, universal function of the electronic device and at least one other touch actuator operable to initiate at least one other function of the electronic device. At 713, the electronic device comprises one or more processors operable with the touch actuator and the at least one other touch actuator. At 713, the one or more processors preclude initiation of the user-defined, universal function of the electronic device when a predefined condition occurs while the touch actuator is actuated.

At 714, the predefined condition of 713 comprises actuation of the touch actuator concurrently with, or within a predefined duration of, actuation of the at least one other touch actuator. At 715, the predefined condition of 713 comprises an in-pocket condition of the electronic device.

At 716, the predefined condition of 713 comprises the electronic device being positioned in a landscape orientation with the touch actuator positioned beneath the electronic device in three-dimensional space. At 717, the predefined condition of 714 comprises actuation of the voice assistant touch actuator exceeding a predefined actuation duration threshold. At 718, the user-defined, universal function of 713 comprises a voice assistant function.

At 719 a method in an electronic device comprises determining, with one or more processors of the electronic device, whether a predefined condition occurs concurrently with, or within a predefined duration of, actuation of a physical voice assistant key of the electronic device. At 719, when the predefined condition occurs concurrently with, or within the predefined duration of, the actuation of the physical voice assistant key of the electronic device, the method comprises precluding, by the one or more processors, execution of a voice assistant function of the electronic device. Alternatively, at 719 when the predefined condition fails to occur concurrently with, or within the predefined duration of, the actuation of the physical voice assistant key of the electronic device, the method comprises executing, by the one or more processors, the voice assistant function of the electronic device. At 720, the executing of 719 by the one or more processors of the voice assistant function of the electronic device occurs only after the physical voice assistant key of the electronic device is released.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:
    detecting, with one or more processors, actuation of a touch actuator of the electronic device having a predefined function responsive thereto;
    determining, by the one or more processors, whether at least one predefined condition is occurring concurrently with the actuation of the touch actuator of the electronic device; and
    when the at least one predefined condition is occurring concurrently with the actuation of the touch actuator of the electronic device, precluding, by the one or more processors, execution of the predefined function in response to the actuation of the touch actuator of the electronic device;
    further comprising, when the at least one predefined condition fails to occur concurrently with the actuation of the electronic device, executing, by the one or more processors, the predefined function.

2. The method of claim 1, wherein the predefined condition comprises actuation of another touch actuator of the electronic device.

3. The method of claim 2, wherein the another touch actuator of the electronic device comprises a volume actuator of the electronic device.

4. The method of claim 2, wherein the another touch actuator of the electronic device comprises a power actuator of the electronic device.

5. The method of claim 1, wherein the predefined function comprises a voice assistant function.

6. The method of claim 1, wherein the predefined condition comprises the actuation of the touch actuator of the electronic device exceeding a predefined duration threshold.

7. The method of claim 1, wherein the predefined condition comprises an in-pocket condition of the electronic device.

8. The method of claim 1, wherein the predefined condition comprises a landscape orientation of the electronic device.

9. The method of claim 8, wherein the predefined condition further comprises the touch actuator being oriented beneath the electronic device in three-dimensional space.

10. The method of claim 1, wherein the predefined function comprises one of a voice assistant function, a camera function, a flashlight function, or a user defined function.

11. The method of claim 1, further comprising detecting, by the one or more processors, release of the touch actuator of the electronic device, wherein the executing, by the one or more processors, the predefined function occurs in response to the release of the touch actuator of the electronic device.

12. The method of claim 11, wherein the touch actuator comprises a physical key of the electronic device.

13. An electronic device, comprising:
    a device housing supporting a touch actuator operable to initiate a user-defined, universal function of the electronic device and at least one other touch actuator operable to initiate at least one other function of the electronic device; and
    one or more processors operable with the touch actuator and the at least one other touch actuator;
    the one or more processors precluding initiation of the user-defined, universal function of the electronic device when a predefined condition occurs while the touch actuator is actuated;
    wherein the predefined condition comprises the electronic device being positioned in a landscape orientation with the touch actuator positioned beneath the electronic device in three-dimensional space.

14. The electronic device of claim 13, wherein initiation of the user-defined, universal function can occurrs across all operating modes of the electronic device.

15. The electronic device of claim 13, wherein the user-defined, universal function is defined using a menu or other control settings of the electronic device.

16. The electronic device of claim 13, wherein the touch actuator comprises a physical key situated on a minor face of the device housing.

17. The electronic device of claim 13, wherein the at least one other touch actuator comprises a power button, volume up/volume down buttons, a silent mode switch, or combinations thereof.

18. The electronic device of claim 13, wherein the user-defined, universal function comprises a voice assistant function.

19. An electronic device, comprising:
    a device housing supporting a touch actuator operable to initiate a user-defined, universal function of the electronic device and at least one other touch actuator operable to initiate at least one other function of the electronic device; and
    one or more processors operable with the touch actuator and the at least one other touch actuator;
    the one or more processors precluding initiation of the user-defined, universal function of the electronic device when a predefined condition occurs while the touch actuator is actuated;
    wherein the predefined condition comprises an in-pocket condition of the electronic device.

20. The electronic device of claim 19, wherein the user-defined, universal function of the electronic device changes as applications operating on the one or more processors change.

* * * * *